United States Patent Office 2,795,623
Patented June 11, 1957

2,795,623

STABILIZATION OF CHLORINATED HYDROCARBONS

Fred W. Starks, Kenmore, N. Y., assignor to E. I. du Pont de Nemours and Company, Wilmington, Del., a corporation of Delaware No Drawing. Application November 15, 1954, Serial No. 468,997

12 Claims. (Cl. 260—652.5)

This invention relates to chlorinated hydrocarbons containing a small amount of a pyrrole. More particularly, it relates to the stabilization against decomposition by light of pyrroles incorporated in chlorinated hydrocarbons.

Chlorinated hydrocarbons of the type used industrially are subject to decomposition by air, light, or heat with the formation of acidic products greatly impairing their utility. Trichloroethylene and perchloroethylene, for example, are frequently utilized for degreasing metals such as iron and aluminum. Acidic solvents cannot be used in degreasing operations because the acid may corrode the metals and produce chloride salts. These salts in turn act as catalysts for further decomposition of the solvent. The auto-catalyzed reaction then evolves large quantities of hydrogen chloride gas and deposits chunks of a black tar in the degreaser and upon metal fabrications being treated.

To prevent decomposition of the type noted above, additives are generally supplied in small quantity to the chlorinated hydrocarbon. Among the best known of such additives are the pyrroles, disclosed in U. S. Patent 2,492,048. Pyrroles suitable as additives include pyrrole itself, N-methyl pyrrole, 2-methyl pyrrole, 3-methyl pyrrole, 2-chloro pyrrole and others. Chlorinated hydrocarbons which may be stabilized by the pyrroles include the common degreasing and dry cleaning solvents trichloroethylene and perchloroethylene but other like materials may be treated in the same manner. The quantity of pyrrole added may vary from as little as 0.001% up to 1% by weight in chlorinated hydrocarbons utilized under severe conditions.

N-methyl pyrrole is very frequently employed in small amounts to stabilize trichloroethylene and perchloroethylene. This agent, however, along with the other pyrroles mentioned, is itself somewhat unstable and may be decomposed by light, heat or oxygen or by a combination of these factors. Thus, trichloroethylene containing an alkyl pyrrole such as N-methyl pyrrole shows discoloration on exposure to bright sunlight for as short a period as 2–4 hours. The same solution, when refluxed for long periods, will deposit a black tar and undergo rapid loss of the pyrrole through decomposition of the latter.

A primary object of this invention is, therefore, to provide a method for preventing the decomposition of pyrroles dissolved in chlorinated hydrocarbons. Another object is provision of means for preventing the oxidation of pyrroles dissolved in trichloroethylene or perchloroethylene. An additional object is to provide a stabilizing agent for preventing the decomposition by ultraviolet light of a pyrrole dissolved in trichloroethylene or perchloroethylene. A further object of the invention is provision of a composition of matter, stable towards ultraviolet light, which comprises trichloroethylene or perchloroethylent carrying a dissolved pyrrole.

The above-mentioned and still further objects are achieved in accordance with this invention by the incorporation of a small quantity of certain organo-metallic chelate compounds in a chlorinated hydrocarbon already containing a pyrrole. The general formula of suitable compounds may be written as:

where M represents a polyvalent metal such as copper, iron, aluminum or nickel and X represents the valence of the metal M. R is the organic moiety of the chelate compound and represents an organic radical attached to the metal M simultaneously through the oxygen of a carboxyl group and also through a different oxygen atom of the same molecule. Preferred compounds forming such bonds are acetoacetic acid and its esters such as methyl, ethyl, and butylacetoacetate and salicylic acid and its esters, e. g. methyl, ethyl and butylsalicylates. Preferred chelate compounds include: copper butylacetoacetate, copper salicylate, aluminum methylsalicylate, aluminum ethylacetoacetate, and the like.

The chelates are non-ionizing compounds. Consequently, the metallic part of the compounds will be referred to in this specification as a metal or element rather than as a cation. The organic part will be called a radical instead of an anion. It will be understood that the combining power of the metal in the chelate will be the same as its ordinary valence.

The quantity of additive utilized can vary greatly. Thus, as little as 0.0001% by weight has some effect. Ordinarily, however, at least 0.001% by weight will be utilized. Up to 1% can be used if it is desired and if the compound is sufficiently soluble. Optimum quantities will vary also with the particular additive utilized. Since the quantity employed may vary within rather wide and somewhat indefinite limits, the quantity chosen may be referred to as an "effective stabilizing" amount or amount "effective to stabilize" the pyrrole. In general, the weight employed need be no more than one-tenth or one-twentieth the weight of the pyrrole in the same sample. Thus the 0.02% by weight of N-methyl pyrrole very effective in stabilizing trichloroethylene can itself be stabilized by 0.001% by weight of copper butylacetoacetate, both weights being based on that of the solvent.

The use of the chelate compounds with pyrroles according to this invention is most useful in trichloroethylene and perchloroethylene. The additives are, however, not restricted to these solvents. They may be used advantageously with pyrrole in other liquid chlorinated hydrocarbons including methylene chloride, chloroform, carbon tetrachloride, ethylene dichloride, trichloroethane, tetrachloroethane, pentachloroethane, vinylidene chloride, butyl chloride and others.

It will be understood that the presence of the chelates as stabilizers does not impair the normal utility of the chlorinated hydrocarbon. Thus the degreasing of such metals as aluminum and iron or its alloys can be carried out in the normal manner with trichloroethylene or perchloroethylene. Maintenance of a small quantity of the chelate in the solvent during degreasing operation will serve to stabilize any pyrrole present, N-methyl pyrrole in particular, and the latter will in turn prevent the decomposition of the solvent. Conditions suitable for the degreasing remain as before the addition of the chelate, i. e. ambient pressure and reflux temperature.

There follow some examples which illustrate the invention in more detail. Unless otherwise indicated, all percentages are by weight.

EXAMPLE 1

This example shows the effect of bright sunlight on various trichloroethylene solutions.

A stock solution of 0.02% N-methyl pyrrole in trichloroethylene was prepared. To separate samples of this solution were added various metal chelates. The resulting mixtures were exposed under ambient conditions of temperature and pressure to bright sunlight. An untreated sample of the stock solution served as a control. Additives and results are shown in Table I.

*Table I.—Effect of light alone*

| Additive (0.01%) | Formula | Appearance of Solution After Exposure to Sunlight | |
|---|---|---|---|
| | | 2–3 Hrs. | 48 Hrs.[1] |
| Copper butylacetoacetate | $Cu\left(\begin{array}{c}O=C-O(CH_2)_3CH_3\\CH\\O-C-CH_3\end{array}\right)_2$ | Clear | Clear |
| Copper salicylate | $Cu\left[\begin{array}{c}H\\O\\\\O-C\\\\O\end{array}\right]_2$ | Clear | Clear |
| Aluminum methylsalicylate | $Al\left[\begin{array}{c}O\\O=C\\CH_3-O\end{array}\right]_3$ | Clear | Clear |
| Aluminum ethylacetoacetate | $Al\left(\begin{array}{c}O=C-OCH_2CH_3\\CH\\O-C-CH_3\end{array}\right)_3$ | Clear | Clear |
| None (Control) | | Brown | Black ppt. |

[1] Exposure was carried out for two days and nights.

EXAMPLE 2

This example shows the use of a preferred additive under stringent conditions.

Samples of trichloroethylene solution were refluxed at atmospheric pressure for four hours in the presence of iron filings and water. Concurrently, each boiling solvent was irradiated with ultraviolet light and oxygen gas was bubbled therethrough. At the end of the reflux period, acidity was measured by extracting the sample with an equal volume of neutral water and determining the pH of the water. The acidity was recorded as milliliters of 1.0 N HCl. Composition of the samples and results are shown in Table II.

*Table II.—Effect of light, heat and oxygen*

| Solvent Sample | Ml., 1.0 N HCl |
|---|---|
| Trichloroethylene | 12.0 |
| Trichloroethylene+0.02% N-methyl pyrrole | 0.60–0.80 |
| Trichloroethylene+0.02% N-methyl pyrrole+0.001% copper butylacetoacetate | 0.00 |

EXAMPLE 3

This example shows that a chelate compound alone in trichloroethylene is not effective to stabilize the solvent and is included only as a control.

Trichloroethylene containing 0.001% of copper butylacetoacetate but no pyrrole was heated under the conditions of Example 2 for four hours. The acidity developed corresponded to that of 12.0 ml. of 1.0 N HCl.

EXAMPLE 4

This example shows the value of copper butylacetoacetate as an additive under storage conditions.

A sample of trichloroethylene containing 0.02% N-methyl pyrrole turned black after 4 hours in the sunlight. A solution of trichloroethylene containing 0.001% copper butylacetoacetate and exposed substantially daily to sunlight has remained clear and water-white for 11 months.

Having described my invention, I claim:

1. The method of imparting light-stability to trichloroethylene containing up to about 1% by weight of N-methyl pyrrole which comprises incorporating therein an effective stabilizing amount of copper butylacetoacetate.

2. The method of imparting light-stability to trichloroethylene containing up to about 1% by weight of N-methyl pyrrole which comprises incorporating therein an effective stabilizing amount of copper salicylate.

3. The method of imparting light-stability to trichloroethylene containing up to about 1% by weight of N-methyl pyrrole which comprises incorporating therein an effective stabilizing amount of aluminum ethylacetoacetate.

4. The method of imparting light-stability to perchloroethylene containing up to about 1% by weight of N-methyl pyrrole which comprises incorporating therein an effective stabilizing amount of copper butylacetoacetate.

5. The method of imparting light-stability to perchloroethylene containing up to about 1% by weight of N-methyl pyrrole which comprises incorporating therein an effective stabilizing amount of copper salicylate.

6. A light-stable composition of matter consisting essentially of trichloroethylene containing up to about 1% by weight of N-methyl pyrrole and effective stabilizing amount of copper butylacetoacetate.

7. A light-stable composition of matter consisting essentially of trichloroethylene containing up to about 1% by weight of N-methyl pyrrole and an effective stabilizing amount of copper salicylate.

8. A light-stable composition of matter consisting essentialy of trichloroethylene containing up to about 1% by weight of N-methyl pyrrole and an effective stabilizing amount of aluminum ethylacetoacetate.

9. A light-stable composition of matter consisting essentially of perchloroethylene containing up to about 1% by weight of N-methyl pyrrole and an effective stabilizing amount of copper butylacetoacetate.

10. A light-stable composition of matter consisting essentially of perchloroethylene containing up to about 1% by weight of N-methyl pyrrole and an effective stabilizing amount of copper salicylate.

11. The method of imparting light-stability to a liquid chlorinated hydrocarbon containing up to about 1% by weight of N-methyl pyrrole which comprises incorporating an effective stabilizing amount of a chelate soluble in said chlorinated hydrocarbon solution, said chelate consisting of a metal of the group consisting of copper and aluminum combined with an organic radical from a member of the group consisting of salicylic acid, esters of salicylic acid, acetoacetic acid and esters of acetoacetic acid.

12. A light-stable composition of matter consisting essentially of a liquid chlorinated hydrocarbon carrying from about 0.001% and 1% by weight of N-methyl pyrrole and a light stabilizer for said pyrrole consisting of an effective stabilizing amount of a metal chelate soluble in said chlorinated hydrocarbon said chelate consisting of a metal of the group consisting of copper and aluminum combined with an organic radical from a member of the group consisting of salicylic acid, esters of salicylic acid, acetoacetic acid and esters of acetoacetic acid.

References Cited in the file of this patent

UNITED STATES PATENTS

| | | |
|---|---|---|
| 2,371,645 | Aitchinson et al. | Mar. 20, 1945 |
| 2,492,048 | Klabunde | Dec. 20, 1949 |